United States Patent
Kupiec

(10) Patent No.: US 6,411,962 B1
(45) Date of Patent: Jun. 25, 2002

(54) SYSTEMS AND METHODS FOR ORGANIZING TEXT

(75) Inventor: Julian M. Kupiec, Cupertino, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/449,944

(22) Filed: Nov. 29, 1999

(51) Int. Cl.$^7$ ............................................. G06F 17/30
(52) U.S. Cl. ............................................. 707/102
(58) Field of Search ................................. 707/102

(56) References Cited

U.S. PATENT DOCUMENTS

| | | | |
|---|---|---|---|
| 4,972,349 A | | 11/1990 | Kleinberger |
| 5,062,074 A | | 10/1991 | Kleinberger |
| 5,519,608 A | | 5/1996 | Kupiec |
| 5,619,709 A | * | 4/1997 | Caid et al. ............... 707/532 |
| 5,696,962 A | | 12/1997 | Kupiec |
| 5,708,825 A | | 1/1998 | Sotomayor |
| 5,794,050 A | * | 8/1998 | Dahlgren et al. ............. 717/8 |
| 5,963,940 A | * | 10/1999 | Liddy et al. ................. 707/5 |
| 5,966,126 A | * | 10/1999 | Szabo ....................... 345/762 |
| 6,076,088 A | * | 6/2000 | Paik et al. ................... 707/5 |
| 6,137,911 A | * | 10/2000 | Zhilyaev ................... 382/225 |
| 6,154,213 A | * | 11/2000 | Rennison et al. .......... 345/356 |
| 6,185,550 B1 | * | 2/2001 | Snow et al. ................. 707/1 |
| 6,199,067 B1 | * | 3/2001 | Geller ...................... 700/17 |
| 6,236,987 B1 | * | 5/2001 | Horowitz et al. ............ 707/3 |

OTHER PUBLICATIONS

"Deriving Concept Hierarchies From Text," Mark Sanderson and Bruce Croft, SIGIR '99 8/99 Berkley, CA, pp. 206–213.

* cited by examiner

Primary Examiner—Wayne Amsbury
(74) Attorney, Agent, or Firm—Oliff & Berridge, PLC

(57) ABSTRACT

Systems and methods are provided for organizing text content of one or more text passages, such as text passages obtained in response to a search query, and/or other text passages, using an organization based on concept terms obtained from the one or more text passages. A hierarchical structure is used to organize the documents in a way that informs the user about co-occurrence relations among terms that represent concepts, indicating the relative degree of occurrence and context of discussion of the terms within the search results. One or more candidate hierarchies may be generated, each with a different term in the most-dominant position. The one or more candidate hierarchies can be evaluated, and a hierarchy to be displayed can be selected based on the evaluation.

26 Claims, 4 Drawing Sheets

CO-OCCURRENCE MATRIX

| | planet | earth | size | mass | Venus | Pluto | Mercury | Moon | density | Saturn | diameter | system |
|---|---|---|---|---|---|---|---|---|---|---|---|---|
| Earth | 6 | | | | | | | | | | | |
| size | 4 | 3 | | | | | | | | | | |
| mass | 4 | 4 | 3 | | | | | | | | | |
| Venus | 2 | 3 | 0 | 1 | | | | | | | | |
| Pluto | 2 | 1 | 2 | 1 | 0 | | | | | | | |
| Mercury | 2 | 2 | 1 | 0 | 3 | 1 | | | | | | |
| Moon | 3 | 3 | 2 | 2 | 0 | 1 | 0 | | | | | |
| density | 6 | 3 | 1 | 2 | 1 | 0 | 0 | 2 | | | | |
| Saturn | 2 | 1 | 2 | 3 | 0 | 0 | 0 | 1 | 1 | | | |
| diameter | 2 | 2 | 1 | 2 | 1 | 0 | 0 | 0 | 1 | 1 | | |
| system | 3 | 3 | 1 | 1 | 0 | 1 | 0 | 3 | 0 | 0 | 0 | |
| terrestrial planets | 3 | 2 | 1 | 1 | 0 | 0 | 0 | 2 | 3 | 1 | 0 | 1 |
| Totals | 39 | 31 | 16 | 20 | 4 | 4 | 6 | 17 | 16 | 7 | 6 | 9 |

CO-OCCURRENCE MATRIX

|  | planet | earth | size | mass | Venus | Pluto | Mercury | Moon | density | Saturn | diameter | system |
|---|---|---|---|---|---|---|---|---|---|---|---|---|
| Earth | 6 | | | | | | | | | | | |
| size | 4 | 3 | | | | | | | | | | |
| mass | 4 | 4 | 3 | | | | | | | | | |
| Venus | 2 | 3 | 0 | 1 | | | | | | | | |
| Pluto | 2 | 1 | 2 | 1 | 0 | | | | | | | |
| Mercury | 2 | 2 | 1 | 0 | 3 | 1 | | | | | | |
| Moon | 3 | 3 | 2 | 2 | 0 | 1 | 0 | | | | | |
| density | 6 | 3 | 1 | 2 | 1 | 0 | 0 | 2 | | | | |
| Saturn | 2 | 1 | 2 | 3 | 0 | 0 | 0 | 1 | 1 | | | |
| diameter | 2 | 2 | 1 | 2 | 1 | 0 | 0 | 0 | 1 | 1 | | |
| system | 3 | 3 | 1 | 1 | 0 | 1 | 0 | 3 | 0 | 0 | 0 | |
| terrestrial planets | 3 | 2 | 1 | 1 | 0 | 0 | 0 | 2 | 3 | 1 | 0 | 1 |
| Totals | 39 | 31 | 16 | 20 | 4 | 4 | 6 | 17 | 16 | 7 | 6 | 9 |

*FIG. 4*

```
planet (14/14)
        mass (4/6)
                Saturn (2/3 2/3)
                diameter (2/3 1/3)
        Venus (2/3)
        Mercury (2/3 1/3)
        density (6/6)
        system (3/4)
        terrestrial planet (3/3)
Total evaluation score: 14 + 4 + (2 + 2) + (2+ 1) + 2 + (2 + 1) + 6 + 3 + 3 = 42
```

*FIG. 5*

SYSTEMS AND METHODS FOR ORGANIZING TEXT

BACKGROUND OF THE INVENTION

1. Field of Invention

This invention relates to systems and methods for organizing a collection of electronic text passages.

2. Description of Related Art

Document retrieval systems, such as World-Wide Web search engines, typically produce a set of result documents in response to a user's query. These search results are organized as a linear list of documents, typically ranked according to a degree of matching with the query. The documents are typically displayed by document title, and, in some cases, are accompanied with a short extract from the beginning of the document, or an excerpted summary that is obtained from the document. The user navigates by viewing the list of titles and/or the extracted text, and successively accessing the documents in an arbitrary order. Words in the extracted documents that correspond to the words used in the query may be highlighted to facilitate review of the document by the user.

U.S. Pat. No. 5,708,825 discloses a system that uses automatically-identified terms to navigate or index document content, without requiring a query to be supplied by a user. This system automatically produces term-based indices. The indexed terms are presented as an alphabetically ordered list.

U.S. Pat. Nos. 5,519,608 and 5,696,962 describe document retrieval systems in which a user inputs a query in natural language, and in which terms are produced that are responsive to the query. The terms are called "answer hypotheses" because they are chosen as being possible answers when specific questions are input.

The World-Wide Web search engine Excite produces words or terms as an aid to the user in formulating a new query. In this system, search results are presented traditionally, as simple ranked lists of document titles, each with attendant summary information intended to be representative of the document as a whole.

The Hyper-Index Browser Prototype generates a "hyper-index" from the search results for a query and allows navigation by terms created from the search results, and also uses the terms for purposes of query expansion. It appears that all result terms shown to the user contain words that were part of the query. It further appears that all terms presented to the user must include all of the query terms.

U.S. Pat. Nos. 4,972,349 and 5,062,074 describe methods that recursively segment a document collection into separate non-overlapping groups of whole documents. Each new group is determined by the most frequently occurring word occurring in the current group, and labeled by that word. The recursive application of this method yields a hierarchical, or "tree", description. This hierarchy is organized according to a maximum frequency count of a word.

SUMMARY OF THE INVENTION

This invention provides systems and methods for organizing text content of one or more text passages, such as text passages obtained in response to a search query, and/or other text passages, not obtained in response to a search query, using an organization based on concept terms obtained from the one or more text passages.

This invention separately provides methods and/or systems for organizing text content of at least one text passage, which may or may not have been obtained in response to a search query.

A hierarchical structure is used to organize the documents in a way that informs the user about co-occurrence relationships among terms that represent concepts, indicating the relative degree of co-occurrence and context of discussion of the terms within the search results.

In various exemplary embodiments, a plurality of terms from the at least one text passage are automatically selected, and at least some of the plurality of selected terms are organized into a hierarchy according to co-occurrence relationships among the some of the plurality of terms. The hierarchy is then displayed.

Before displaying a final hierarchy, one or more candidate hierarchies may be generated, with one or more respective candidate terms placed in the most-dominant position of the hierarchy or respective hierarchies. The one or more candidate hierarchies can be evaluated, and a final hierarchy for display can be selected based on the evaluation.

Selectable elements may be associated with at least one term of a hierarchy such that, when the selectable element is selected, a text passage associated with the term is displayed. In some exemplary embodiments, the display space required to indicate the content of many documents is reduced. This allows a user to view more results in a given display frame of a display device.

In some exemplary embodiments, terms are used that expose terminology contained in search results. This improves user feedback and provides the user with at least a preliminary indication of the content of the results, beyond the terminology used in a search query.

In some exemplary embodiments, organization continues until the text has been broken into the smallest possible concepts. This provides a finer level of description.

In the systems and methods according to this invention, document content can be summarized with or without a query supplied by a user. Furthermore, the internal content of documents, rather than entire documents, can be organized. This allows a finer level of description.

Additionally, terms can be organized according to their co-occurrence with other terms in a document or group of documents. This allows a finer level of description than when words or terms are organized only their individual maximum frequency in a given group of documents.

Furthermore, in the systems and methods according to this invention, rather than relying on a single frequently-occurring word to label a group of different documents, a label term is used to label text units containing that term. The relation between a label term and a text unit containing the label term is therefore more clear than in the above-described prior method that uses a single label to characterize a group of whole documents.

Additionally, according to this invention, text units from a document may be referred to from arbitrary places in the tree. For example, the text units reached from a selectable element associated with a particular term may freely mix the content of several different documents. This provides a more useful organization than in the above-described prior methods in which, once a document is assigned to a label, that document's content cannot be referred to by any parts of the tree that are not dominated by the label. Furthermore, according to this invention, document content need not be segmented into non-overlapping groups. Rather, overlapping tree relationships can be built on the same content.

These and other features and advantages of this invention are described in or are apparent from the following detailed description of exemplary embodiments.

BRIEF DESCRIPTION OF THE DRAWINGS

Exemplary embodiments of this invention will be described in detail, with reference to the following figures, in which:

FIG. 4 is an exemplary co-occurrence matrix of selected terms; and

FIG. 5 is a resultant display of a hierarchy showing dominant and subordinate terms.

DETAILED DESCRIPTION OF EXEMPLARY EMBODIMENTS

This invention provides systems and methods for organizing the text content of one or more text passages. The text content is organized by extracting terms from the one or more text passages, and arranging the terms in a hierarchical arrangement that indicates the relative degree of co-occurrence with other terms and/or the context of the concept terms.

Figure 1:
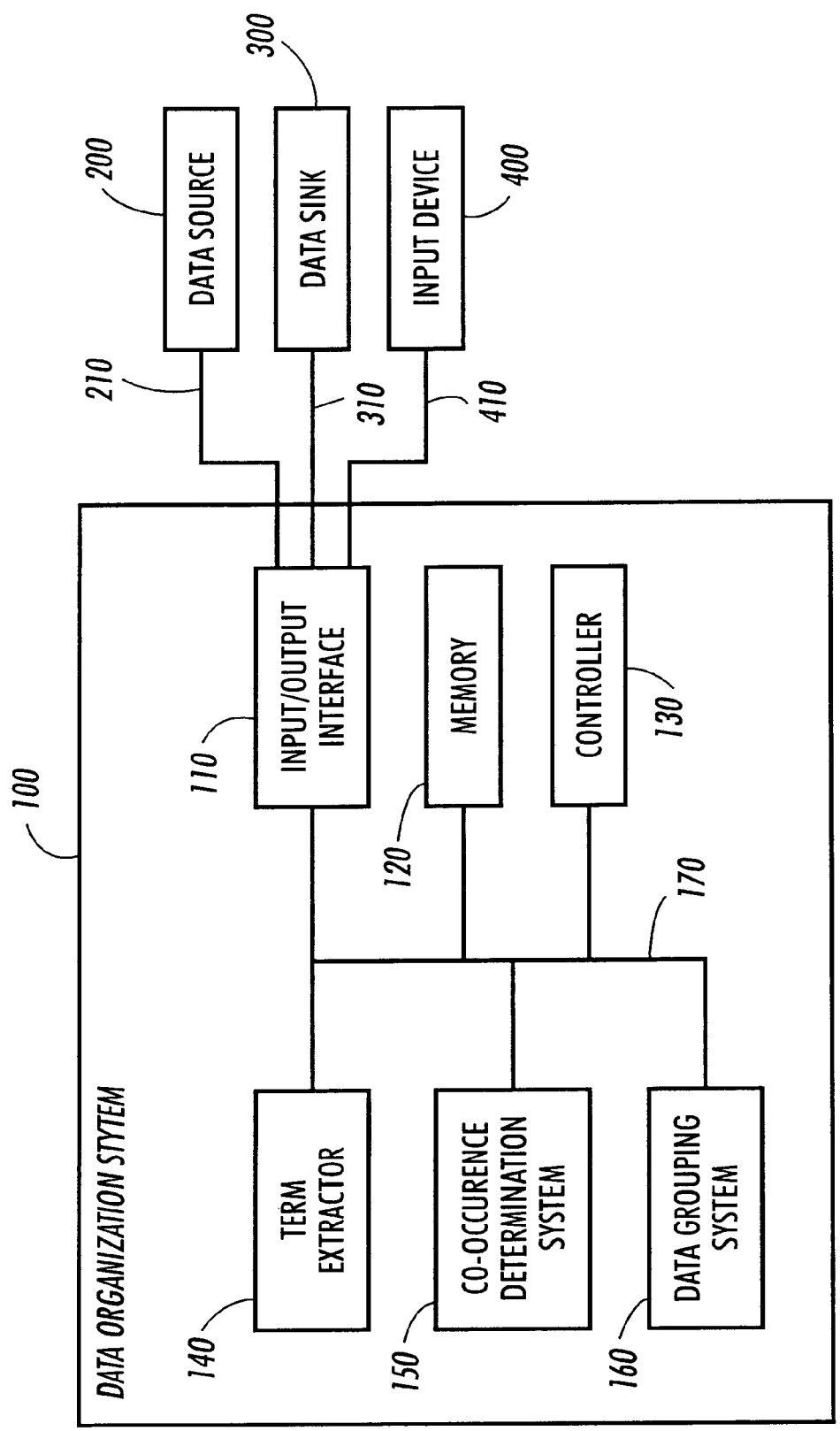
FIG. 1 is a functional block diagram of an exemplary embodiment of a data organization system according to this invention.

FIG. 1 is a functional block diagram of an exemplary embodiment of a data organization system 100 according to this invention. The data organization system 100 includes an input/output interface 110, a memory 120, a controller 130, a term extractor 140, a co-occurrence determination system 150 and a data grouping system 160, all of which are electrically and/or functionally interconnected by a data/control bus 170.

A data source 200, a data sink 300 and an input device 400 may be connected to the data organization system 100 by links 210, 310 and 410, respectively.

The data source 200 can be a locally or remotely located computer or database, or any other known or later developed device that is capable of generating electronic data. Similarly, the data source 200 can be any suitable device that stores and/or transmits electronic data, such as a client or a server of a network. The data source 200 can alternatively be a portable storage medium such as a magnetic or optical disk that is accessed by a suitable disk drive located within or externally of the data organization system 100. The data source 100 can be connected to the data organization system 100 over a connection device, such as a modem, a local area network, a wide area network, an intranet, the Internet, any other distributed processing network, or any other known or later-developed connection device.

It should also be appreciated that, while the electronic data can be generated just prior to, or even while, being organized by the data organization system 100, the electronic data could have been generated at any time in the past. The data source 200 is thus any known or later-developed device which is capable of supplying electronic data over the link 210 to the data organization system 100. The link 210 can thus be any known or later-developed system or device for transmitting the electronic data from the data source 200 to the data organization system 100.

The data sink 300 can be any known or later-developed system capable of receiving the electronic data organized by the data organization system 100 over the link 310 and displaying the organized data. For example, the data sink 300 can be a computer or television monitor, a marking engine or the like, or can be a device, such as a magnetic or optical storage disk, a computer memory, or the like, for storing the organized data for later display. The link 310 can be any known or later-developed system or device for transmitting the electronic data from the data source 200 to the data organization system 100.

The input device 400 can be any known or later-developed system that allows a user to input command information into the data organization system 100. For example, the input device can include one or more of a keyboard, a mouse, a track ball, a touch pad, a touch screen, a voice recognition-based input system, and the like. The link 410 connecting the input device 400 to the data organization system 100 can be any known or later-developed system or device for transmitting the electronic data from the input device 400 to the data organization system 100.

Any or all of the links 210, 310 and 410 can be a direct link, such as one or more electric and/or optical cables. Any or all of the links 210, 310 and 410 can also be a local area network, a wide area network, the Internet, an intranet, or any other distributed processing and storage network. Moreover, any or all of the links 210, 310 and 410 can also be or include a wireless link.

Other configurations of the elements shown in FIG. 1 may be used without departing from the spirit and scope of this invention.

It should be understood that each of the systems shown in FIG. 1 can be implemented as portions of a suitably programmed general purpose computer. Alternatively, each of the systems shown in FIG. 1 can be implemented as physically distinct hardware circuits within an ASIC, or using a FPGA, a PDL, a PLA or a PAL, or using discrete logic elements or discrete circuit elements. The particular form each of the circuits shown in FIG. 1 will take is a design choice and will be obvious and predictable to those skilled in the art.

Furthermore, one or more of the systems shown within the data organization system 100 in FIG. 1 may be provided externally of the data organization system 100 and operate as needed in conjunction with the other systems via the input/output interface 110. Moreover, either or both of the data source 200 and the data sink 300 may be provided as an integral part of the data organization system 100 and connected directly to the data/control bus 170.

Text data obtained from the data source 200 is input to the data organization system 100 via the input/output interface I 10 and stored in the memory 120. The term extractor then extracts terms, which may be, for example, words, word phrases or the like, from the input text data. These terms may be extracted according to one or more of various criteria and/or methods, such as those described below and also such as those described in the above-described references, the disclosures of which are incorporated herein by reference in their entireties. If the text data has been obtained from the data source 200 in response to a query that has, for example, been input by a user via the input device 400, at least one of the extracted terms may be based on, and/or similar to, one or more terms of the query. If the text data has not been obtained based on a query, all of the extracted terms may be determined by techniques such as those described below and also such as those described in the above-described references.

The co-occurrence determination system 150 determines terms that co-occur with each other within a predefined text unit, such as a sentence, a paragraph, a page, a document or the like. The co-occurrence determination system 150 may determine a degree of co-occurrence based upon a total number of co-occurrences, a relative number of co-occurrences, a proximity of the co-occurring terms, i.e., how close the co-occurring terms are to each other in the text unit, and/or the like.

The data grouping system 160 groups at least some of the co-occurring terms into a hierarchy based upon their respective degrees of co-occurrence. The data grouping system 160 may perform a grouping method, described in detail below, by which a plurality of different hierarchies are created and evaluated, and the best hierarchy among the evaluated hierarchies is selected. The data grouping system 160 may assign a given term to more than one position in the hierarchy, and also may assign a plurality of terms to the same position in the hierarchy.

Data that has been thus grouped by the data grouping system 160 is output to the data sink 300 via the input/output interface 10. A user views the data that has been output to the data sink 400 by, for example, viewing the data on a computer monitor or the like.

Figure 2:
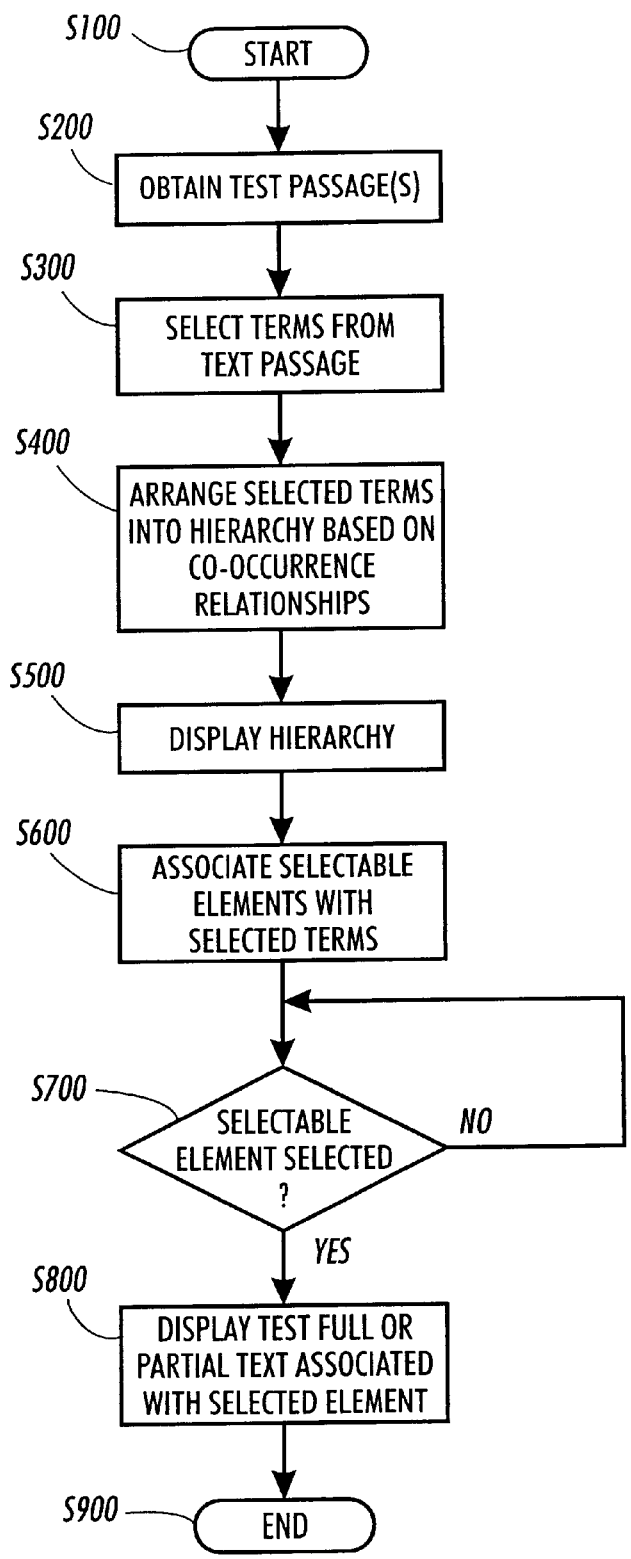
FIG. 2 is a flowchart outlining one exemplary embodiment of a method for organizing text data.

FIG. 2 is a flowchart outlining one exemplary embodiment of a method for organizing text data. Beginning in step S100, control continues to step S200, where at least one text passage is obtained. The one or more text passages may include one or more of a prepared collection of data, such as an electronic encyclopedia or the like, a single data file, or a collection of data files, created by one or more users, a collection of e-mail transmissions or the like, one or more text passages retrieved from one or more databases in response to a query, and the like. Control then continues to step S300.

In step S300, a plurality of terms, such as words, word phrases or the like, are selected from the one or more text passages. These terms may be extracted according to one or more of various criteria and/or methods, such as those described below and also such as those described in the incorporated references.

Next, in step S400, the selected terms are arranged in a hierarchy based on co-occurrence relationships among the selected terms. Then, in step S500, the hierarchy is displayed. It should be appreciated that the hierarchy could be displayed progressively, piece by piece, while the data is being arranged. In this case, control need not wait for completion of step S400 before beginning to perform step S500. Control then continues to step S600.

In step S600, selectable elements are associated with the terms that were selected in step S300. These selectable elements are linked to respective passages of text from which the terms were selected, so that, after a given selectable element is selected, the respective text passage is displayed. It should be appreciated that the selectable elements may be created earlier in the procedure and that, therefore, step S600 may be performed any time after step S300 and before step S700. Next, in step S700, determination is made whether one of the selectable elements has been selected. This step is repeated until one of the selectable elements has been selected. After a selectable element has been selected, control continues to step S800.

In step S800, the passage of text linked with the selectable element is displayed. It should be appreciated that the full text passage or document associated with the selectable element may be displayed, or that, alternatively, a portion of the text passage or document may be displayed. Then, in step S900, the control procedure ends.

It should be appreciated that the method of FIG. 2 may be interrupted at any time by a user to modify a query, alter a data organization constraint, and/or the like. For example, a user who is conducting a search may, upon viewing the hierarchy displayed in step S500, decided to modify his or her query without selecting any selectable elements. In this case, control returns to step S200.

Figure 3:
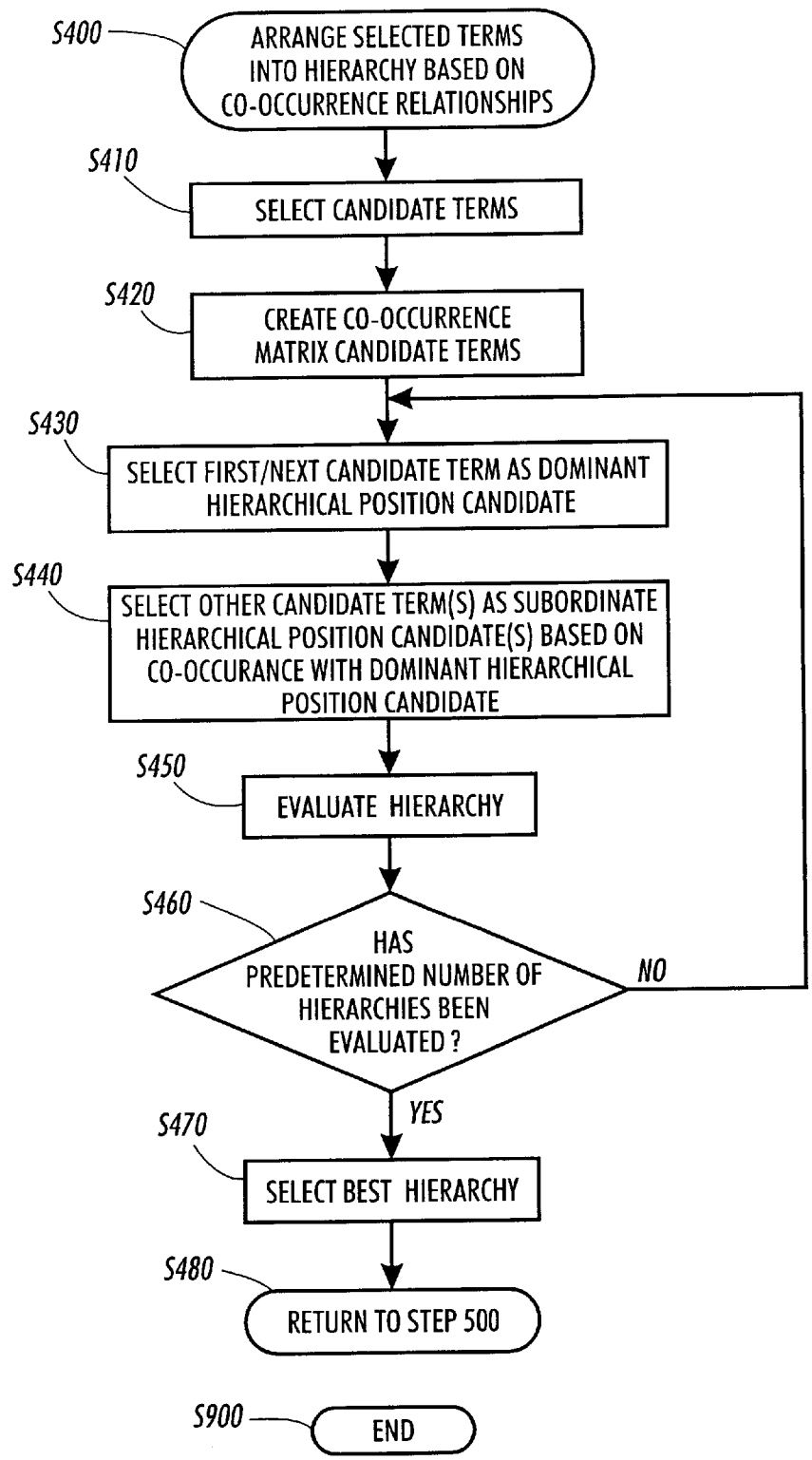
FIG. 3 is a flowchart outlining in greater detail one exemplary embodiment of a method for arranging selected terms into a hierarchy based on co-occurrence relationships.

FIG. 3 is a flowchart outlining in greater detail one exemplary embodiment of a method for arranging selected terms into a hierarchy based on co-occurrence relationships of step S400. Beginning in step S400, control continues to step S410, where a plurality of candidate terms are selected. This step narrows the list of selected terms to a manageable size. The candidate terms may be selected according to one or more predetermined criteria, such as frequency of occurrence, similarity to query terms or proximity to query terms, when a query has been input to obtain the text passage(s), or the like, so that a co-occurrence matrix of candidate terms can be created.

It should be appreciated that, if the list of originally selected terms is already of a manageable size, all of the originally selected terms become "candidate terms". In this case, the list of originally selected terms is not altered in step S410, and control effectively continues directly to step S420.

In step S420, the selected candidate terms are arranged into a co-occurrence matrix. The co-occurrence matrix shows how often each candidate term co-occurs with each other candidate term. The co-occurrence matrix also may show the total number of occurrences of each candidate term. Then, in step S430, one of the candidate terms is selected as a dominant hierarchical position candidate, i.e., a candidate for being placed at a dominant position in the hierarchy. The dominant hierarchical position candidate may, for example, be the most-frequently occurring term among the candidate terms, the term most similar to a query term, or the like. Next, in step S440, one or more other candidate terms is/are selected as a subordinate hierarchical position candidate(s), i.e., a candidate(s) for being placed at a subordinate position in the hierarchy. The subordinate hierarchical position candidate(s) is/are selected based on its/their relative degree of co-occurrence with the dominant hierarchical position candidate. Control then continues to step S450.

In step S450, a candidate hierarchy that has been built with the dominant hierarchical position candidate selected in step S430 and the subordinate hierarchical position candidate(s) selected in step S440 is evaluated and given a score. Then, in step S460, a determination is made whether a predetermined number of candidate hierarchies has been evaluated. If, in step S460, a predetermined number of candidate hierarchies have been evaluated, control continues to step S470. Otherwise, control returns to step S430, and steps S430-S460 are repeated to build an additional candidate hierarchy. In this subsequent iteration(s) of step S430, a candidate term other than the candidate term used in the first iteration is selected as the dominant hierarchical position candidate.

In step S470, the scores of the evaluated candidate hierarchies are compared, and the hierarchy with the best score is selected to be displayed. Control then returns to step S500 of FIG. 2.

Various aspects of the invention are described below using specific examples. For example, the query "What are active volcanoes?" may have been submitted by the user. In response, a term list, when the systems and methods according to this invention are implemented in the context of a retrieval system operating on an encyclopedia, will be based on the submitted query. Table 1 shows a portion of the term hierarchy that could be produced in response to this query.

TABLE 1 active volcanoes, ++
    Hawaii, ++
        Mauna Loa, Kilauea
    Kamchatka Peninsula, Kamchatka
    Vanuatu
        Ambrym
            Marum, Benbow
        Tanna
        Banks Islands
    Sicily, Etna, ++
        Italy
        Vesuvius While the hierarchical positions of Table 1 and other display examples shown below are shown by indents, with the left-most term being the most-dominant term and the right-ward progression of indents showing increasingly subordinate positions, it should be appreciated that numerous other hierarchical presentations are possible. For example, a "pull-down menu" format may be used, in which selecting a window containing a dominant term causes a list of first-level subordinate terms to be displayed, selecting a first-level subordinate term causes a list of second-level subordinate terms to be displayed, and so forth. Anther possible format is a "tree-branch" structure in which, for example, the most-dominant term is displayed at the top of a display screen, first-level subordinate terms are placed directly underneath the most-dominant term with lines drawn from the most-dominant term to the respective first-level subordinate terms, second-level subordinate terms are placed directly underneath the first-level subordinate terms with lines drawn from each first-level subordinate term to its associated second-level subordinate terms, and so forth. Other possible formats include a hyperbolic tree or the like. In short, any format that suitably indicates hierarchical relationships is acceptable. Furthermore, it should be appreciated that the hierarchy need not be arranged in a top-to-bottom format, but may also be arranged in a bottom-to-top, left-to-right or right-to-left format.

It is assumed that the terms in Table I are presented as or along with selectable elements, such as hyperlinks, that can be selected by an input device, such as those outlined above. The selectable elements provide a link between each term and one or more text passages, or one or more portions of one or more text passages, from which the term was extracted. When a particular selectable element is selected, the one or more text passages, or one or more portions of the one or more text passages, from which the term was extracted are displayed. In the following discussion, for convenience, it will be assumed that the terms themselves function as selectable elements, and that a user selects a selectable element by "clicking on" the term, i.e., selecting the term with a mouse.

When a first term is contained within the scope of a second term, clicking on the first term shows text passages, or "snippets", from one or more documents, that contain both the first term and the second term. The snippets are typically one or more adjacent sentences. For example, the terms "Mauna Loa, Kilauea" have been organized under both "active volcanoes" and "Hawaii"These are meaningful partitions. The hierarchy shown in Table 1 indicates that passages or documents containing "Hawaii" is a significant subset of the results of the query about active volcanoes. Likewise, within passages or documents containing "Hawaii", "Mauna Loa" and "Kilauea" have significant mentions.

If the user mouse-clicks on "Mauna Loa, Kilauea", the user will be shown text snippets containing "Mauna Loa" or "Kilauea", and "Hawaii" and "active volcanoes," in close proximity. It should be appreciated that the requisite degree of proximity and/or maximum size of the text snippets can be predetermined. Clicking on "Hawaii" will likewise show text snippets containing "Hawaii" and "active volcanoes".

When a text snippet is displayed, terms occurring in the term hierarchy and/or terms exactly matching a term in the user's query may be highlighted in the displayed text snippets, such as by being displayed in bold-face type, a different font or a different color or by being underlined, highlighted or the like. If desired, if both terms that are exact matches and terms that merely occur in the term hierarchy are present in a snippet, each may be displayed in a different distinct format. For example, terms occurring in the term hierarchy but not exactly matching a query term may be displayed in red, and exact matches may be shown in bold-face type.

This arrangement enables all the instances of a particular term to be found, across all the documents or text passages in a collection. This resultant organization is different from a traditional display in which search results are presented in an ordered linear fashion as document titles, with the beginning of the document presented to provide further information about the content of the document.

In a hierarchy such as the one shown in Table 1 above, some lines can contain more than one term. One criterion for placing two or more terms together is that they co-occur in a high proportion of text snippets containing either term. This is the case for "Mauna Loa, Kilauea" in Table 1. Additionally, linguistic criteria can be used in combination with co-occurrence information for placing two terms together, as represented by the terms:

Kamchatka Peninsula, Kamchatka

Here, the linguistic criterion is that there are two proper noun terms that include "Kamchatka", which are recognized as related geographical locations. Thus there is a certain likelihood that these terms share close topicality. Furthermore, in this particular collection, "Kamchatka Peninsula" has four associated text snippets, and "Kamchatka" has two. By mixing the terms and their associated terms, less display space, i.e., vertical display space, is used. This enables the term hierarchy to use less physical display space, and also is helpful when compressing the result set.

In Table 1, the symbol "++" appears in several places. This symbol is a selectable element which, when selected, displays occurrences of the term(s) to its left hand side that do not occur anywhere in text snippets of the hierarchy below it. So, for example, clicking on the "++" element to the right of the term "active volcanoes" causes text snippets to be displayed that include the term "active volcanoes", but none of the terms lower in the hierarchy of which "active volcanoes" is a parent. Similarly, clicking on the "++" element to the right of the terms "Sicily, Etna" causes text snippets to be displayed that include "Sicily" or "Etna", but that include none of the terms lower in the hierarchy of which these terms are a parent.

Strict inclusion relationships are not necessarily enforced for every text snippet at a given location in the hierarchy. To exemplify this, consider the result of selecting the term "Italy". One of the resulting snippets may include "The volcanoes of Italy . . . " rather than the whole term "active volcanoes". However, the inclusion of this text snippet under the term "active volcanoes" is justified by the fact that "Italy" does occur with "active volcanoes" under other text snippets. Thus, even if only a portion of a dominantly positioned multi-word term is in a snippet associated with a subordinately positioned term, the snippet may still be included, provided that the exact multi-word term is present in some minimum number of other snippets associated with the subordinately positioned term. For example, in an actual example related to Table 1, "Italy" did occur with "active volcano(es)" in two out of the three total text snippets associated with "Italy".

A given term may be inserted in more than one place in a hierarchy. This would be appropriate when a large proportion or a large number of occurrences of the term are accounted for by two different positions, or contexts, in the hierarchy. If desired, the system may be structured such that, for terms that appear more than once in a hierarchy, selecting the term provides a new page from which all instances of the term in the text collection may be reached, not only the text snippets relating to its originating position in the hierarchy. Thus, a user can easily navigate all instances of a term, no matter where it is included in a hierarchy.

Exemplary embodiments of procedures for selecting terms to be organized into a hierarchy, and for selecting the associated text snippets according to this invention permit two distinct starting points (a) where a query has been supplied; and (b) where no query is supplied.

If a query has been supplied, the text collection may have been produced by an information retrieval system that responded to that query. Then text units, such as sentences, paragraphs or the like, in all documents over which the query is performed, are found that contain terms that match any words of the query, either by exact match or by matching word stems or the like. Text units in the vicinity of the text unit containing the match may also be selected. For example, one or two sentences before and/or one or two sentences after the text unit containing the match may also be selected.

Common function words, such as "the", "a", "of" and the like, may be eliminated from consideration for matching. While all text units are being extracted, terms that contain query words, and other frequently-occurring terms and/or terms that satisfy certain pre-specified criteria, e.g., such as, for example, synonyms of query words, are selected as candidate members of the term hierarchy. Only the set of text units that are associated with the query terms and other frequently-occurring terms are needed for the next stage of constructing the hierarchy.

If a query has not been supplied, terms are first extracted from all text units present in the collection. As above, a list of the most-frequently-occurring terms is then constructed, and the text units associated with those terms are retained. A term may be included in the list even if it is not among the most-frequently-occurring terms, provided that it does have associated text units from a document(s) that otherwise would not be represented in the set of retained text units.

It should be appreciated that operations performed when no query has been supplied can be applied simultaneously with those operations when a query has been supplied.

A term can be a word or word sequence that is predefined, a word or word sequence that satisfies a noun term pattern, an uninflected form of a non-auxiliary verb, or another query word(s). The analysis required for noun term and verb recognition can be done using morphological analysis, tokenization, part-of-speech tagging and finite-state recognizers, for noun terms. These functions are available in, for example, LinguistX, a product of Inxight Software, Inc.

Statistically-derived terms based solely on repeated word or word stem co-occurrence can also be used. Terms may also be defined by the noun terms in the titles of the documents in the collection, or may be defined literally as the title.

The text units in which a particular term occurs are then associated with the particular term. Congruent forms of the particular term may be present in the text units. Congruent forms of a term are treated as additional instances of the particular term.

For example, if a query has been supplied, the representative term may be an exact noun term form that occurs in the query, or the uninflected form of a main verb. For terms that don't occur in a query, a systematic form of a noun term may be used as the label, e.g., the singular form, or the most-commonly-occurring form, e.g., singular form or plural form, of the term may be used as the label. Congruent forms for term matching include:

1) an exact match, i.e., the same sequence of word tokens;
2) stemmed versions of the term, e.g., conflated inflections of a non-auxiliary verb, or instances of both singular and plural versions, e.g. as in "active volcano" and "active volcanoes";
3) a single noun sub-term, e.g. the right-most noun, or a multi-word noun sub-term. For example, instances of Monongahela River and Allegheny River can be gathered under their own terms, and also under the common, newly constructed term "River";
4) known relations. Terms may be grouped together and represented by a single canonical member. For example, "American Telephone and Telegraph" and "AT&T", may be considered congruent due to lookup in a synonym dictionary, and represented by the term "AT&T".

Details regarding selection of text units and the extraction of candidate terms for inclusion in a term hierarchy are discussed below. As indicated above, a text unit might be selected if that term contains a word with a stem common to a supplied query. Once the text units are gathered, it is often desirable to find the best text units for a supplied query. It is also often desirable to prevent the text units from disproportionately long documents from swamping the content of a term hierarchy.

That is, after a query has been supplied, text units are selected based on their degree of overlap with a supplied query. This involves counting the number of stem matches between terms in the query and terms in the text unit. It will be realized that several text units may match the query in an identical manner, provided such text units contain the same set of query words. For example, a match between the query and a text unit may be characterized by a binary vector, ordered according to the sequence of query content words. For example, each element may be assigned a "1" if there is a corresponding stem match anywhere in the text unit, and a "0" otherwise. These vectors will be referred to as term combinations.

A match also has a score associated with it. The score associated with a match may be determined by more sophisticated matching criteria than simple word stem matches. An exemplary method for obtaining the scores for matches is described in U.S. Pat. No. 5,519,608, incorporated herein by reference in its entirety. In brief, this method isolates noun terms and main verbs used in the query. The degree to which a query noun term matches a noun term in a text unit is used to qualify the score. For instance, an exact match with the query term "active volcano" ranks higher than a match between the following two segments:

"active efforts were made to predict eruptions of the volcano . . . "

"Volcano debris was strewn everywhere."

Thus, two matches that have the same term combinations may have different scores.

In a long document, there may be many repetitions of given term combinations. Consequently, it is desirable to retain only a fixed number of the highest scoring instances of each unique combination. This provides the advantage of limiting the total number of text units extracted from any single document, in turn ensuring that the structure of a term hierarchy is not overly biased by a few large documents.

Once a set of text units have been obtained, a set of candidate terms for use in the term hierarchy is extracted from the set of text units. When a term in the hierarchy is subsequently selected, the text units containing the selected term will be shown to the user.

An important criterion for selection is frequency of occurrence, as the aim is to select a set of terms that co-occur in text units. As terms are extracted, they are grouped together under representative labels, as described above. Selecting a fixed-size list of candidate terms may involve sorting extracted terms on the basis of a weighted score based on one or more of the following factors:

(1) the terms' frequencies of occurrence;

(2) whether or not the term is a proper noun term, as determined, for example, by looking to a list of fixed terms, noun term extraction, the presence of initial capital letters, appearance in non-sentence initial position, and/or local text analysis to see if a potential proper noun that occurs in a sentence-initial position also occurs in a capitalized form elsewhere in a document but not in sentence-initial position; and (3) presence of the term or an uninflected form of that term on a predefined list or a list obtained by auxiliary processing. An example of such auxiliary processing is given in U.S. Pat. No. 5,519,608, described above, in which terms are created as "answer hypotheses".

The list of candidate terms and their associated text units are then used to construct a term hierarchy. Producing the term hierarchy can be viewed as a problem of optimizing a given evaluation function in the presence of certain constraints, where the evaluation function is sensitive to co-occurrences of terms, and the constraints include minimum co-occurrence counts. A variety of general methods, such as simulated annealing, hierarchical clustering, decision trees and dendrograms and the like, are applicable for building and optimizing hierarchical structures.

There are many alternative hierarchies that can be constructed from any reasonably-sized list of candidate terms. The goal is to find the hierarchy that has the highest possible score when an evaluation function is applied to it. The exemplary embodiment of a hierarchy building method according to this invention described below builds an initial set of partial hierarchies and iteratively modifies the set of partial hierarchies to produce new hierarchies, by adding and moving individual terms and other partial hierarchies in the set. In this manner, it is likely that an optimal or near-optimal term hierarchy will be produced, without exhaustively evaluating every possible term hierarchy that can be produced from the candidate term list.

There are three main aspects to this exemplary embodiment of a hierarchy building method according to this invention: (1) an evaluation function, (2) constraints and (3) iterative growing and refining of new term hierarchies. The evaluation function is used to score several possible term hierarchies and to select the best term hierarchy to present to the user. The constraints determine whether a term or a partial term hierarchy can be inserted at a given point in another hierarchy. A principal constraint is the selected "overlap criterion" at any point. This is a specified fraction that determines how often a term must co-occur with a second, more frequently occurring, term in order to be assigned to a hierarchical position subordinate to the hierarchical position of the second term. For example, in one exemplary implementation, the overlap criterion is 0.6, and term A occurs more often than term B. If more than 60% of the total occurrences of term B co-occur with term A, then term B can be placed as a new level in the hierarchy with term A as its parent.

In order for a third term C to be placed at yet another level of the hierarchy, another constraint should be satisfied by any sequence of terms A, B, C. Namely, a certain minimum number of occurrences, or fraction of occurrences, of term C should be joint occurrences with terms B and A.

The iterative growing and refining of new term hierarchies includes generating an initial set of partial term hierarchies, then adding to the sets of partial term hierarchies and modifying the sets of partial term hierarchies to produce larger hierarchies that contain more members of the candidate terms, and that also contain higher scoring arrangements of the candidate terms according to the evaluation function. The overlap criterion may be iteratively relaxed in order to build highly inclusive partial hierarchies that have a high evaluation score.

The operations outlined above can be elaborated upon by looking at the results of the query "What planet is Earth's twin in size and mass?" to a retrieval system, where the system has returned search results that are the text passages shown in Table 2. In Table 2, each passage is a paragraph and/or sentences from a given document, each preceded by its title.

TABLE 2 planets

Mercury, Venus, Earth, and Mars are referred to as terrestrial, or Earth-like, planets to distinguish them from the Jovian or Jupiter-like bodies on the outer side of the asteroids. The Moon is our planetary satellite. However, in a sense the Moon may be considered a terrestrial planet also, because it is so large compared to the Earth that the two are often considered as a double-planet system. The terrestrial planets are relatively small and of low mass but high density compared to the large, massive, but low-density, planets Jupiter, Saturn, Uranus, and Neptune. Average density reflects the materials of which the planets are composed. The high density of the terrestrial planets, ranging from 3.3 for the Moon to 5.5 for the Earth, indicates they are made of solid, rocky material.

TABLE 2-continued solar system

The inner planets are all comparable in size, density, and other characteristics to the Earth and so are generally referred to as the terrestrial, or Earth-Like, planets. Included are Mercury, Venus, Earth, and Mars.

satellite

By mass and size, the Moon; Jupiter's Io, Europa, Ganymede and Callisto; Saturn's Titan; and Neptune's Triton predominate. Callisto, Ganymede, Titan, and Triton exceed the size of the planets Mercury and Pluto. The mean densities of these four satellites--between 1.8 and 2.0 g / cu cm (112 and 125 lb / cu ft)--are however, substantially lower than that of the Moon, indicating that they cannot consist of solid silicate rocks as does the Moon, but that their cores must be encrusted with ices whose composition is similar to that of their central planets. All other satellites are of asteroidal rather than planetary size. Some small satellites orbit their planets in a direction opposite to the planet's rotation--another indication of possible asteroidal origin.

Moon

The Moon is the only natural satellite of the Earth and a unique member of the solar system in several respects. With a radius of 1,738 km (1,080 mi), it is approximately one-quarter of the size of the Earth and 81.3 times less massive. Although the solar system contains both larger and more massive satellites than the Moon, none except Pluto's newly discovered moon differs so little from its planet in mass or size. Indeed, the system formed by it and Earth constitutes a veritable double planet.

Pioneer

Besides taking the first closeup pictures of Saturn (which gave 20 to 30 times more detail than Earth-based photographs), Pioneer Saturn also indicated that the planet has a rocky inner core about the size of the Earth (or about one-ninth of Saturn's diameter), but with a mass three times as great, and has a magnetic field that is weaker than the Earth's.

Pluto

With a visual magnitude of 15.3, Pluto appears only as a faint yellowish point of light, slightly elongated at times in the largest telescopes. It has a diameter of about 4,000 km (2,500 mi), according to a 1980 measurement by the technique of speckle interferometry. Pluto may have a silicate-rock core covered by a blanket of ices. Spectroscopy has indicated that the surface is covered by methane frost and that the planet has a very thin atmosphere composed of methane. There may be some other heavy gas that prevents the methane from evaporating entirely. Pluto's mass is about one five-hundredth that of Earth.

Venus

Venus, the second PLANET from the sun, is often called the Earth's sister planet because it so closely approximates our own world in diameter, mass, and density, and probably also in composition and internal structure.

In this example, the following candidate term list has been made, by, for example, Murax, a research product of Xerox Corporation.

planet, Earth, size, mass, Venus, Pluto, Mercury, Moon, density, Saturn, diameter, times, system, terrestrial planet The first step is to construct an initial set of partial term hierarchies. This may be done by first creating a term co-occurrence matrix. An entry in the term co-occurrence matrix indicates the number of times one candidate term occurs with another in text units of the given document collection. It should be noted that multiple occurrences of a term within a text unit, such as a predefined number of words, a sentence, paragraph or the like, may, for example, be considered as only a single occurrence. A term is considered to co-occur with another if they are both present in the same text unit, as defined above. In the more general case where co-occurrence is considered by sentences in the local vicinity, one may also consider co-occurrence not in the same sentence as having a fractional value.

Regarding merging criteria for this example, singular and plural forms of noun terms are merged. Thus, occurrences of the word "planet" and "planets" are counted under the singular form "planet". Letter-case is not used to make distinctions, e.g. between proper nouns and common nouns, such as "Moon" versus "moon".

Table 3 shows an exemplary co-occurrence matrix for this example. FIG. 4 reproduces this exemplary matrix.

TABLE 3

|         | planet | earth | size | mass | Venus | Pluto | Mercury | Moon | density | Saturn | diameter | system |
|---------|--------|-------|------|------|-------|-------|---------|------|---------|--------|----------|--------|
| Earth   | 6      |       |      |      |       |       |         |      |         |        |          |        |
| size    | 4      | 3     |      |      |       |       |         |      |         |        |          |        |
| mass    | 4      | 4     | 3    |      |       |       |         |      |         |        |          |        |
| Venus   | 2      | 3     | 0    | 1    |       |       |         |      |         |        |          |        |
| Pluto   | 2      | 1     | 2    | 1    | 0     |       |         |      |         |        |          |        |
| Mercury | 2      | 2     | 1    | 0    | 3     | 1     |         |      |         |        |          |        |

TABLE 3-continued

|  | planet | earth | size | mass | Venus | Pluto | Mercury | Moon | density | Saturn | diameter | system |
|---|---|---|---|---|---|---|---|---|---|---|---|---|
| Moon | 3 | 3 | 2 | 2 | 0 | 1 | 0 | | | | | |
| density | 6 | 3 | 1 | 2 | 1 | 0 | 0 | 2 | | | | |
| Saturn | 2 | 1 | 2 | 3 | 0 | 0 | 0 | 1 | 1 | | | |
| diameter | 2 | 2 | 1 | 2 | 1 | 0 | 0 | 0 | 1 | 1 | | |
| system | 3 | 3 | 1 | 1 | 0 | 1 | 0 | 3 | 0 | 0 | 0 | |
| terrestrial planets | 3 | 2 | 1 | 1 | 0 | 0 | 0 | 2 | 3 | 1 | 0 | 1 |
| Totals | 39 | 31 | 16 | 20 | 4 | 4 | 6 | 17 | 16 | 7 | 6 | 9 |

The "Totals" line in the matrix of Table 3 indicates the count of the co-occurrences in a column, with the exception that counts of unity are ignored, and elements on the diagonal are ignored, i.e., counts of a term with itself are ignored. Thus, these counts indicate how many times any given candidate term co-occurs with each of the other candidate terms. The higher the count, the more likely that the term will be a parent of other terms. It should be appreciated that the matrix is symmetric about its diagonal, although the complete contents have been omitted from this matrix for convenience.

If unity counts were included, the totals would be upper bounds on the actual co-occurrences between a given term and all other candidate terms. The upper bound is achieved when all the terms in a row or column jointly occur in the same text.

To grow hierarchies with single term roots, and to grow term hierarchies with multiple roots, a set of initial partial term hierarchies are formed by choosing certain terms as dominant hierarchical position candidate terms. For example, the "n" most-frequently occurring terms, can be selected. These terms are candidates to be placed as individual roots of separate trees. These terms are placed at the most-dominant position in the respective hierarchies.

For example, taking n=6, the dominant hierarchical position candidate terms are:

planet (14 occurrences), Earth (10 occurrences), size (7 occurrences), moon (7 occurrences), mass (6 occurrences), density (6 occurrences).

In this example, hierarchies with an overlap criterion of ⅔ are beginning to be built. Values in the co-occurrence matrix are used to decide if the overlap criterion is met.

First, an attempt to add terms at subordinate positions under each dominant hierarchical position candidate, or "root" is made. Terms may be considered for addition in their order of co-occurrence totals.

Referring to Table 3, for the tree with "planet" as its root, "Earth" is considered first but fails the overlap criterion, because 6/10<0.666. However, "mass" can be added, and "density", "system", "terrestrial planets", and "Venus" can also be added. Table 4 shows the resulting hierarchy. FIG. 5 illustrates this hierarchy being displayed, such as on a computer monitor.

TABLE 4 planet (14/14)
    mass (4/6)
        Saturn (2/3 2/3)
        diameter (2/3 1/3)
    Venus (2/3)
        Mercury (2/3 1/3)
    density (6/6)
    system (3/4)
    terrestrial planet (3/3)
Total evaluation score: 14 + 4 + (2 + 2) + (2 + 1) + 2 + (2 + 1) + 6 + 3 + 3 = 42

In Table 4, each term is marked with numbers of the form (x/y). x indicates the joint number of co-occurrences of the given term with its parent(s) and y indicates the total number of occurrences of the given term (y). The root "planet" is assigned its total occurrence count (14/14), and "mass" co-occurs with planet 4 out of its total of 6 occurrences, giving (4/6).

When placing "Saturn", we find from the co-occurrence matrix that "Saturn" satisfies the overlap constraint for both "planet" and "mass". It co-occurs jointly with each of them, both twice out of its total three occurrences. Note that these are joint co-occurrence counts, not values copied from the co-occurrence matrix.

In this example, a minimum joint co-occurrence value of 1 is used. Therefore, "Saturn" can be placed as a leaf, i.e., in a subordinate position, under "mass". It is assigned the pair of values 2/3 2/3, indicating that it occurs jointly with "planet" twice, and jointly with "planet" and "mass" twice. A similar situation happens when "Mercury" and "diameter" are added. The evaluation score for the hierarchy is the sum of the "x" values for all the terms. Therefore, co-occurrences under multiple parents increase the score, e.g., 2+2 for "Saturn".

Next, a new hierarchy is built, this time with "Earth" as the root. The new hierarchy is shown in Table 5.

TABLE 5

Earth (10/10)
    mass (4/6)
        diameter (2/3 2/3)
    Venus (3/3)
        Mercury (2/3 2/3)
    system (3/4)
    terrestrial planet (2/3)
Total evaluation score: 10 + 4 + (2 + 2) + 3 + (2 +2) + 3 + 2 = 30

Comparing the above two hierarchies, the one headed by "planet" is preferable so far, because it has a higher total evaluation score. In general, multiple iterations of adding terms to trees may be performed, to create further new hierarchies.

When no further additions can be made, or when a fixed number of iterations have been performed, the overlap constraint may be relaxed to include more terms in the trees that have been made so far. Relaxing the constraint also means that terms in the tree could be placed in higher parent positions. In other words, bottom-up movement can occur in addition to the top-down growing of the trees performed up to this point. In this example, the overlap constraint is relaxed to ½. The result is shown in Table 6.

TABLE 6 planet (14/14)
    Earth (6/10)
        mass (4/6 2/6)
            diameter (2/3 2/3 2/3)
        Venus (2/3 2/3)
            Mercury (2/3 1/3 1/3)
        density (6/6 3/6)
        system (3/4 1/4)
        terrestrial planet (3/3 3/3)
Total evaluation score: 59

Considering single term additions to the "planet" tree, "Earth" is tried first, and satisfies the overlap constraint as being parent for "mass", "Venus", "Mercury", "density", "diameter" and "system". "Saturn" is removed from the tree as it fails the overlap criterion with "Earth" (⅓).

Adding the remaining terms in continuing order of co-occurrence total adds "size" and "Saturn" back in at the bottom of the hierarchy of Table 6, as shown in Table 7.

TABLE 7 planet (14/14)
    Earth (6/10)
        mass (4/6 2/6)
            diameter (2/3 2/3)
        Venus (2/3 2/3)
            Mercury (2/3 1/3 1/3)
        density (6/6 3/6)
        system (3/4 1/4)
        terrestrial planet (3/3 3/3)
    size (4/7)
        Saturn (2/3 1/3)
Total evaluation score: 64

No further additions are made to this tree by another iteration of addition. Note that the terms "moon" and "Pluto" do not satisfy the ½ overlap criterion anywhere in this hierarchy. At this point, remaining candidate terms may be omitted and this hierarchy may be considered as final. This decision may be based, for example, on how large the hierarchy is. This decision may be made automatically according to preset constraints or may be made based on manual input from the user when he or she subjectively decides that the hierarchy is acceptable and does not need to be further developed. Alternatively, to further build the hierarchy rooted by "planet", the overlap criterion will need to be further relaxed. This will increase the number of possible moves in the hierarchies and make increasingly infrequent improvements to their evaluation scores.

To preserve the quality of the inclusion relationship between terms, instead of further reducing the overlap criterion, it is possible to attach additional terms as independent roots. For example, the term from Table 3 with the highest co-occurrence total that is not yet included among the highest-scoring hierarchy, which, among the above examples, is the hierarchy of Table 7, is "moon", with a co-occurrence total of 17. Therefore, "moon" is added as a separate, independent root, as shown in Table 8, followed by "Pluto", also added as a separate root.

TABLE 8 planet (14/14)
    Earth (6/10)
        mass (4/6 2/6)
            diameter (2/3 2/3)
        Venus (2/3 2/3)
            Mercury (2/3 1/3 1/3)
        density (6/6 3/6)
        system (3/4 1/4)
        terrestrial planet (3/3 3/3)
    size (4/7)
        Saturn (2/3 1/3)
moon (7/7)
Pluto (5/5)
Total evaluation score: 76

Note in the above that the overlap constraint would allow "system" to be moved under "moon", but doing so would result in a decreased evaluation score.

In general, it is expected to see multiply-rooted hierarchies for result sets where semantically and lexically uncorrelated query words are used, such as, for example, "foxglove" and "mandibles."

To improve on the hierarchy of Table 8, it is necessary to further relax the overlap criterion. For example, the overlap criterion may be relaxed to ⅓. If this is considered to be a final overlap value, in order to avoid generating many superfluous alternative hierarchies, it is also possible to restrict term additions to be moves lower in the hierarchy. Relaxing the overlap criterion for the hierarchy of Table 8 yields the hierarchy of Table 9, shown below.

TABLE 9 planet (14/14)
    Earth (6/10)
        size (4/7 3/7)
            mass (4/6 2/6 1/6)
                  diameter (2/3 2/3 1/3 1/3)
                      Saturn (2/3 1/3 1/3 1/3 1/3)
        Venus (2/3 2/3)
            Mercury (2/3 1/3 1/3)
        moon (3/7 2/7)
            system (3/4 2/4 1/4)
            density (6/6 3/6 1/6)
                  terrestrial planet (3/3 2/3 2/3 1/3)
Pluto (5/5)
Total evaluation score: 88

In the last iteration in creating the above hierarchy, "Pluto" could be placed under "planet", with a score of 2 versus 5 in its root position. However, placing "Pluto" as shown resulted in a higher total evaluation score than placing "Pluto" under "planet".

Previously, a term's total occurrence score was used when the term appears in a root position. When multiple roots are allowed, it is possible that the highest scoring hierarchy is the one in which all terms are single roots. For example, in the above case, the sum of the occurrence totals is 74. If no other hierarchy considered had a score greater than or equal to 74, then a hierarchy including all terms as single roots would "win", which is not a very useful result. To prevent such a situation, the selected roots may be assigned a score that is some fraction of their occurrence totals. For example, if "1/3" were selected as the fraction, the resulting root scores would be 14/3 and 5/3 for "planet" and "Pluto" respectively. The development of hierarchies under the individual roots is not affected, but "Pluto" is finally merged under planet with a score of 2 versus 5/3. In other words, the root terms are penalized by being multiplied by a fraction so that their individual scores do not unduly influence the total evaluation score.

Table 10 shows an example of text snippets when a selectable element associated with the term "Earth" is selected from the hierarchy of Table 9. Terms that were part of the original query, "What planet is Earth's twin in size and mass?", appear in bold-face type.

TABLE 10 planets

MERCURY, VENUS, EARTH, and MARS are referred to as terrestrial, or Earth-like, planets to distinguish them from the Jovian or Jupiter-like bodies on the outer side of the asteroids. In a sense the Moon may be considered a terrestrial planet also, because it is so large compared to the Earth that the two are often considered as a double-planet system.
...The high density of the terrestrial planets, ranging from 3.3 for the Moon to 5.5 for the Earth, indicates they are made of solid, rocky material.

Solar system

The inner planets are all comparable in size, density, and other characteristics to the Earth and so are generally referred to as the terrestrial, or Earth-like, planets. Included are Mercury, Venus, Earth, and Mars.

Moon

The Moon is the only natural satellite of the Earth and a unique member of the solar system in several respects. With a radius of 1,738 km (1,080 mi), it is approximately one-quarter of the size of the Earth and 81.3 times less massive....
...Indeed, the Earth-Moon system constitutes a veritable double planet.

Pioneer

Besides taking the first closeup pictures of Saturn (which gave 20 to 30 times more detail than Earth-based photographs), Pioneer Saturn also indicated that the planet has a rocky inner core about the size of the Earth or about one-ninth of Saturn's diameter) but with a mass three times as great and has a magnetic field that is weaker than the Earth's.

Pluto

With a visual magnitude of 15.3, Pluto appears only as a faint yellowish point of light, slightly elongated at times in the largest telescopes. It has a diameter of about 4,000 km (2,500 mi), according to a 1980 measurement by the technique of speckle interferometry. Pluto may have a silicate-rock core covered by a blanket of ice. Spectroscopy has indicated that the surface is covered by methane frost and that the planet has a very thin atmosphere composed of methane. There may be some other heavy gas that prevents the methane from evaporating entirely. Pluto's mass is about one five-hundredth that of Earth.

Venus

Venus, the second planet from the sun, is often called the Earth's sister planet because it so closely approximates our own world in diameter, mass, and density, and probably also in composition and internal structure.

In the example of Table 10, terms from the original query were bold-faced. However, it should be appreciated that, instead of or in addition to highlighting terms from the query, terms from dominant and/or subordinate positions in the hierarchy could be highlighted, by boldfacing, underlining, appearing in a different color or font, and/or any other highlighting method.

All text snippets in Table 10 include the term "Earth". If desired, the results can be made comprehensive by also including text snippets that included "Earth" in text units, but which would otherwise be left out due to co-occurrence counts of unity, or in other words, because they did not co-occur with other terms from the hierarchy.

It should also be appreciated that the text shown in result pages exemplified by Table 10 can also be organized by a term hierarchy rooted by "Earth", and generated in similar fashion to that described. A possible hierarchy for organizing the text snippets for "Earth" is shown below in Table 11.

TABLE 11

Earth
   planet
      Venus

TABLE 11-continued

```
                    density
                    Mercury
            moon
                    terrestrial planet
            size
            mass, diameter
                    Saturn
    Pluto
```

Further possibilities for the display of text snippets include showing text units only once, or distinctly marking text units that have been previously presented to the user in other pages, by displaying them in a different color, font, typeface or the like.

Additionally, the structure may be such that, when a particular term is selected, a new hierarchy is generated with that term as a root. This function may, for example, be presented as an option by displaying a selectable element associated with the term, and generating a new hierarchy with that term as root when that selectable element is selected. For example, in addition to or instead of the "++" selectable elements of Table 1, a "Δ" selectable element may be displayed which, when selected, causes a new hierarchy to be generated.

While the systems and methods according to this invention have been described in conjunction with the specific embodiments described above, many equivalent alternatives, modifications and variations will become apparent to those skilled in the art once given this disclosure. Accordingly, the preferred embodiments of the invention as set forth above are considered to be illustrative and not limiting. Various changes to the described embodiments may be made without departing from the spirit and scope of the invention.

For example, rather than automatically generating multiple candidate hierarchies and selecting the best-scoring one for display, an acceptance standard may be set in advance and, if a hierarchy meets the acceptance standard, it can be automatically selected for display without generating and comparing other candidate hierarchies. For example, an acceptance standard may be set such that, if a candidate hierarchy has a total evaluation score of 75 or above, for example, it may be automatically displayed, without generating any more candidate hierarchies.

What is claimed is:

1. A computer-implemented method of organizing text content of at least one text passage, comprising;
    automatically selecting a plurality of terms from the at least one text passage;
    obtaining a plurality of candidate terms from the plurality of terms, the plurality candidate terms being less than the plurality of terms;
    organizing at least some of the plurality of candidate terms into a hierarchy according to co-occurrence relationships among the some of the plurality of candidate terms, including
        arranging the plurality of candidate terms into a co-occurrence matrix showing a number of times each candidate term co-occurs with each other candidate term in the at least one text passage;
        selecting one of the candidate terms as a first dominant hierarchical position candidate term; and
        generating a first candidate hierarchy, comprising:
            arranging the first dominant hierarchical position candidate term in a dominant hierarchical position,
            selecting at least one other candidate term, based on the co-occurrence matrix and a predetermined overlap criterion, and
            arranging the at least one other candidate term in a hierarchical position that is subordinate to the dominant hierarchical position; and
        displaying the hierarchy.

2. The method according to claim 1, wherein the at least one text passage is obtained in response to a search query, and at least one of the plurality of terms is selected based on at least one word contained in the search query.

3. The method according to claim 1, wherein the at least one text passage is obtained in response to a search query, and at least one of the plurality of terms is selected based on at least one word not contained in the search query.

4. The method according to claim 1, wherein the at least one text passage is not obtained in response to a search query.

5. The method according to claim 1, wherein the plurality of candidate terms are obtained based on at least one of: 1) frequency of occurrence of respective ones of the candidate terms; 2) whether the term is a proper noun term; 3) a predefined list; and 4) a list obtained by auxiliary processing.

6. The method according to claim 1, further comprising:
    evaluating the first candidate hierarchy and determining a first evaluation score;
    selecting a candidate term other than the first dominant hierarchical position candidate term as a second dominant hierarchical position candidate term;
    generating a second candidate hierarchy, comprising:
        arranging the second dominant hierarchical position candidate term in the dominant hierarchical position,
        selecting at least one other candidate term, based on the co-occurrence matrix and the predetermined overlap criterion, and
        arranging the at least one other candidate term in the hierarchical position that is subordinate to the dominant hierarchical position;
    evaluating the second candidate hierarchy and determining a second evaluation score;
    comparing the first and second evaluation scores; and
    retaining the first candidate hierarchy if the first evaluation score is better than the second evaluation score, and retaining the second candidate hierarchy if the second evaluation score is better than the first evaluation score.

7. The method according to claim 1, wherein the first dominant hierarchical position candidate term is a most-frequently-occurring term among the candidate terms.

8. The method according to claim 1, wherein each unique term is selected no more than a predetermined number of times.

9. The method according to claim 1, wherein at least one of the plurality of terms in the hierarchy occurs in a plurality of locations within the hierarchical organization.

10. The method according to claim 1, wherein at least two of the at least some of the plurality of terms appear together in a same position in the displayed hierarchy.

11. A data carrier carrying a program capable of performing the steps of the method according to claim 1.

12. A computer-implemented method of organizing text content of at least one text passage, comprising;
    automatically selecting a plurality of terms from the at least one text passage;
    organizing at least some of the plurality of terms into a hierarchy according to co-occurrence relationships among the some of the plurality of terms;

displaying the hierarchy; and associating a plurality of selectable elements with a respective plurality of displayed terms of the displayed hierarchy; wherein if one of the plurality of selectable elements is selected, at least one text passage including the respective displayed term and at least one of 1) text sequentially before the displayed term and 2) text sequentially after the at least one displayed term, is displayed; and if another of the plurality of selectable elements is selected, the at least one text passage is displayed again.

13. A computer-implemented method of organizing text content of at least one text passage, comprising;

automatically selecting a plurality of terms from the at least one text passage;

organizing at least some of the plurality of terms into a hierarchy according to co-occurrence relationships among the some of the plurality of terms;

displaying the hierarchy; and associating a plurality of selectable elements with a respective plurality of displayed terms of the displayed hierarchy, wherein a first selectable element comprises a first displayed term, and a second selectable element comprises an element separate from the displayed terms.

14. The method according to claim 13, wherein:

if one of the first and second selectable elements is selected, at least one first text passage including the at least one displayed term and at least one of 1) text sequentially before the at least one displayed term and 2) text sequentially after the at least one displayed term, is displayed, the at least one first text passage including at least one displayed term from a position subordinate to a hierarchical position of the at least one displayed term; and if the other of the first and second selectable elements is selected, at least one second text passage including the at least one displayed term and at least one of 1) text sequentially before the at least one displayed term and 2) text sequentially after the at least one displayed term, is displayed, the at least one second text passage not including any terms displayed in the hierarchy at a position subordinate to a hierarchical position of the at least one displayed term.

15. A computer-implemented method of organizing text content of at least one text passage, comprising;

automatically selecting a plurality of terms from the at least one text passage;

organizing at least some of the plurality of terms into a hierarchy according to co-occurrence relationships among the some of the plurality of terms;

displaying the hierarchy; and associating at least one selectable element with at least one displayed term of the displayed hierarchy, wherein, when the at least one selectable element is selected, a new hierarchy is generated based on the at least one displayed term.

16. A computer-implemented method of organizing text content of at least one text passage, comprising;

automatically selecting a plurality of terms from the at least one text passage;

organizing at least some of the plurality of terms into a hierarchy according to co-occurrence relationships among the some of the plurality of terms wherein organizing at least some of the plurality of terms into a hierarchy comprises:

generating a plurality of candidate hierarchies; and assessing a score to each candidate hierarchy based on at least one predetermined constraint; and displaying a best-scoring one of the candidate hierarchies.

17. A computer-implemented method of organizing text content of at least one text passage, comprising;

automatically selecting a plurality of terms from the at least one text passage;

organizing at least some of the plurality of terms into a hierarchy according to co-occurrence relationships among the some of the plurality of terms by evaluating individual ones of the at least some of the plurality of terms based on at least one predetermined co-occurrence constraint.

18. The method according to claim 17, wherein the at least one predetermined constraint comprises a fraction that specifies how many times, compared to a number of occurrences of a first term of the at least some of the plurality of terms in the hierarchy, a second term of the at least some of the plurality of terms in the hierarchy must co-occur with the first term in order to be placed at a hierarchical position subordinate to a position of the first term.

19. The method according to claim 17, wherein organizing at least some of the plurality of terms into a hierarchy according to co-occurrence relationships among the some of the plurality of terms further comprises:

relaxing the predetermined co-occurrence constraint after evaluating individual ones of the at least some of the plurality of terms; and re-evaluating individual ones of the at least some of the plurality of terms based on the relaxed at least one co-occurrence constraint.

20. A computer-implemented data organization system, comprising:

a term extractor that extracts a plurality of terms from at least one text passage;

a co-occurrence determination system that determines co-occurrence relationships between at least some of the plurality of terms;

a co-occurrence matrix generator that generates a co-occurrence matrix based on the co-occurrence relationships, an individual score being assigned to each co-occurrence relationship within the co-occurrence matrix;

a data grouping system that generates a plurality of hierarchies by organizing at least some of the at least some of the plurality of terms based on the co-occurrence relationship; and a scoring system that assigns a total evaluation score to each hierarchy based on the individual scores within the co-occurrence matrix;

wherein the data organization system retains a best-scoring one of the plurality of hierarchies.

21. The data organization system of claim 20, further comprising a data retriever that retrieves the at least one text passage.

22. The data organization system of claim 20, further comprising a display that displays at least the best-scoring hierarchy.

23. A computer-implemented data organization system, comprising:

a term extractor that extracts a plurality of terms from at least one text passage;

a co-occurrence determination system that determines co-occurrence relationships between at least some of the plurality of terms;

a data grouping system that generates a hierarchy by organizing at least some of the at least some of the plurality of terms based on the co-occurrence relationship;

a display that displays the hierarchy;

a selectable element generator that generates at least one selectable element associated with at least one of the terms in the displayed hierarchy; and a controller that, when the at least one selectable element is selected, alters the display.

24. The data organization system of claim 23, wherein the controller alters the display by displaying at least one text passage including the at least one displayed term and at least one of 1) text sequentially before the at least one displayed term and 2) text sequentially after the at least one displayed term.

25. The data organization system of claim 24, wherein the at least one text passage includes at least one displayed term from a position subordinate to a hierarchical position of the at least one displayed term.

26. The data organization system of claim 24, wherein the at least one text passage does not include any terms displayed in the hierarchy at a position subordinate to a hierarchical position of the at least one displayed term.

* * * * *